United States Patent
Aghazadeh

(10) Patent No.: US 9,595,105 B2
(45) Date of Patent: *Mar. 14, 2017

(54) INDEPENDENT DIGITAL TEMPLATING SOFTWARE, AND METHODS AND SYSTEMS FOR USING SAME

(71) Applicant: Arthromeda, Inc., Lowell, MA (US)

(72) Inventor: Mehran S. Aghazadeh, Newton, MA (US)

(73) Assignee: ARTHROMEDA, INC., Lowell, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/001,989

(22) Filed: Jan. 20, 2016

(65) Prior Publication Data
US 2016/0140709 A1    May 19, 2016

Related U.S. Application Data

(63) Continuation of application No. 13/187,916, filed on Jul. 21, 2011, now Pat. No. 9,262,802.

(60) Provisional application No. 61/399,929, filed on Jul. 21, 2010.

(51) Int. Cl.
| G06K 9/00 | (2006.01) |
|---|---|
| G06T 7/00 | (2006.01) |
| G06T 3/40 | (2006.01) |
| G06K 9/20 | (2006.01) |
| G06T 11/60 | (2006.01) |

(52) U.S. Cl.
CPC .......... *G06T 7/0012* (2013.01); *G06K 9/2081* (2013.01); *G06T 3/40* (2013.01); *G06T 11/60* (2013.01); *G06T 2200/24* (2013.01); *G06T 2207/10116* (2013.01); *G06T 2207/20092* (2013.01); *G06T 2207/30008* (2013.01)

(58) Field of Classification Search
USPC .................................................. 382/128–134
See application file for complete search history.

(56) References Cited

U.S. PATENT DOCUMENTS

| 6,160,866 A | 12/2000 | Mazess et al. |
|---|---|---|
| 6,701,174 B1 | 3/2004 | Krause et al. |
| 6,792,071 B2 | 9/2004 | Dewaele |

(Continued)

*Primary Examiner* — Alex Liew
(74) *Attorney, Agent, or Firm* — Nutter McClennen & Fish LLP

(57) ABSTRACT

Provided are a computer-aided system (medical device), a computer-aided method, and a computer program product useful in digital templating for prosthetic arthroplasty, for example, total hip arthroplasty. The invention includes digital image capture and scaling features that can be used in conjunction with any digital radiographic image stored using picture archiving and communication system (PACS), regardless of PACS provider or PACS format. Patient radiographic images are captured, imported, and scaled, e.g., to actual size, to match the scale of a digital template of any prosthesis selected by the user. The computer program product is a stand-alone product, used independently of any software interface, including software accessed through connection to a network or the internet. The software, method, and system are suitable for use with a stand-alone computer and permit improved and cost-effective selection of prostheses for any particular clinical situation.

8 Claims, 1 Drawing Sheet

PROFEMUR - Renaissance Hip System
Size 10 - Neutral Neck Angle 135°
Heads Centers: S, M, L, XL, XXL

(56) References Cited

U.S. PATENT DOCUMENTS

| | | | |
|---|---|---|---|
| 7,388,972 B2 * | 6/2008 | Kitson | A61B 90/36 |
| | | | 382/128 |
| 7,394,946 B2 * | 7/2008 | Dewaele | G06T 7/606 |
| | | | 345/619 |
| 8,075,184 B2 | 12/2011 | King et al. | |
| 8,160,325 B2 | 4/2012 | Zug et al. | |
| 8,160,326 B2 | 4/2012 | Zug et al. | |
| 8,265,949 B2 | 9/2012 | Haddad | |
| 8,398,645 B2 | 3/2013 | Aker et al. | |
| 8,484,001 B2 | 7/2013 | Glozman et al. | |
| 9,262,802 B2 * | 2/2016 | Aghazadeh | G06T 3/40 |
| 2010/0076563 A1 | 3/2010 | Otto et al. | |
| 2012/0020540 A1 | 1/2012 | Aghazadeh | |

* cited by examiner

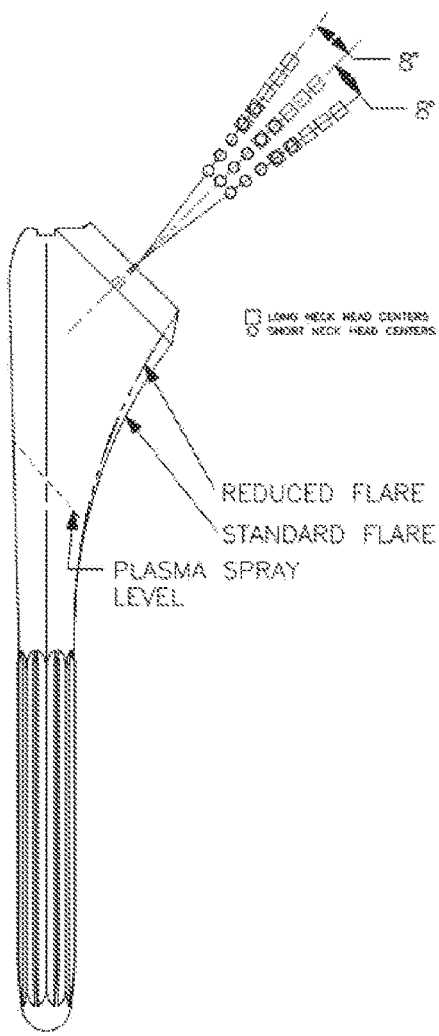
PROFEMUR - Renaissance Hip System
Size 10 - Neutral Neck Angle 135°
Heads Centers: S, M, L, XL, XXL

INDEPENDENT DIGITAL TEMPLATING SOFTWARE, AND METHODS AND SYSTEMS FOR USING SAME

RELATED APPLICATION

This application is a continuation of U.S. patent application Ser. No. 13/187,916, filed on Jul. 21, 2011, entitled "INDEPENDENT DIGITAL TEMPLATING SOFTWARE, AND METHODS AND SYSTEMS USING SAME," which claims benefit under 35 U.S.C. §119(e) of U.S. provisional Patent Application No. 61/399,929, filed on Jul. 21, 2010, each of which is hereby incorporated by reference in its entirety.

BACKGROUND OF THE INVENTION

The goal of a majority of orthopedic surgery is restoring the function of joints in the human skeletal system. A variety of artificial joints and parts of joints, known as prostheses and implants, are used to reconstruct joints with proper positioning and alignment. The best outcomes of operations involving such prostheses rely on optimal selection and alignment of the prostheses in accordance with the original anatomy. Each joint may vary in contour and size in different body sizes. Deformities like fractures are also different in size and shape. Further, bone quality also changes by age. As a result, currently each commercially available prosthesis for a given joint is offered in a variety of shapes and sizes by different manufactures to accommodate each individual indication.

Although a variety of prostheses is available for different patient needs, this same variety has made it more difficult for clinicians to select the most appropriate size and manufacturer for a given clinical situation. Difference between sizes and shapes of each particular implant is not easily discernable. One of the key problems in optimization of orthopedic surgery is selecting the right size of implant that allows for proper fit and alignment.

An undersized prosthesis can result in poor fixation and early loosening, while an oversized prosthesis can lead to intra-operative fracture. For example, in total hip arthroplasty, a tight press-fit interface is desirable when placing the femoral prosthesis. A stem that is too small will not be stable and eventually subside inside the femoral canal. Attempting to insert an oversize stem will result intraoperative fracture and complication. It is well known in the clinical community that these issues are sometimes not identified until after the surgery is completed, resulting in devastating post-operative complication. Such complications have been reported in up to 24% of patients.

Templating

To help reduce these problems, pre-operative planning has been conventionally performed to select suitable implants from the variety of different sizes and shapes available. Templating is an important part of pre-operative planning for an orthopedic arthroplastic operation to select an implant suited by its size and shape for use in replacement of a particular joint in a particular patient.

An acetate template is a magnified outline drawing of a particular prosthesis in one size and shape, printed on a transparent overlay. Acetate templates are typically provided by prosthesis manufacturers. They come in a set of different sizes, for example, up to twenty for some implants. These transparencies are placed on pre-operative radiographs, usually plain x-rays, over the bony structure which is going to be replaced during the operation, in the desired orientation to identify the most appropriate prosthesis, size and shape, as well as the proper place and orientation to restore alignment and create maximum stability for reconstructed joint.

Templating before operation provides the surgeon the opportunity to anticipate specific problems; determine the most appropriate type, size and shape of available prosthesis; prevent possible intra-operative and post-operative complications; optimize biomechanics by restoring proper alignment; and ensure availability of the desired prosthesis.

Benefits of templating include improvement of surgical accuracy, restoration of biomechanics of joints and limbs, decreased complications such as fractures and subsidence, reduced operative time, and more long-lasting outcome.

Conventional templating also has some fundamental drawbacks. It does not address and reconcile the fact that the magnification of pre-operative radiographs varies by patients' body size, while implant manufacturers supply only one set of acetate templates with a single magnification factor (usually 120%) for each particular prosthesis. This discrepancy therefore can lead to unreliable measurement and sizing information. Pre-operative planning is only possible when both x-ray and sets of acetate templates are available. Printing and storing radiographic films is costly for hospitals and centers. Acetate templates are subject to physical wear and tear, and they can be misplaced, such that will not be available at the time needed for templating. A few sets of up to twenty templates for each type of implant may be required liar optimal pre-operative planning. Total number of required sets of templates multiples by the number of operating rooms in a hospital, as they need to be available in each operating room. Production, distribution and storage of acetate templates are expensive and impose large burdens on manufacturers and hospitals alike.

Recent Advances in Radiographic Imaging Technology

Hospitals have been replacing their old technology radiology systems with digital systems across the United States. Nowadays, digital image acquisition, processing, and viewing with computers are used instead of the old standard techniques of obtaining radiographs and conventional film screening. They have been exchanging their old film storages for picture archiving and communications systems (PACS). This digital system saves time, expense, and resources required for acquiring, storing, and retrieving the images and information that were once saved on film. It also has reduced the costs associated with a superfluous inventory of prostheses. A hospital does not have to have all different sizes of all different implants in inventory at all the time, only the sizes that are going to be used in next few days. If cases are templated in advance, implants and sizes will be known.

Like other digital images, a major advantage of digital radiographic images is their accessibility, which is practically from anywhere and immediately. The only requirement is a computer with connection to a network or the internet. These images can easily be stored and transferred by digital media or via network and internet, and they can be duplicated to unlimited numbers without losing quality.

Digital Templating

One major advantage of recent advances in radiographic imaging technology is using software for viewing digital radiographic images. It has had a substantial impact on orthopedic surgery by making it possible to perform pre-operative planning, including digital templating, electronically on a computer using special software.

A limited variety of digital templating software has been developed during past few years. They provide a library of digital versions of the templates of different kinds of prostheses, in different sizes and shapes, that a user can place on a radiographic image and use for pre-operative planning. They also provide many different tools for making different kinds of evaluations and measurements; such as angles, length, distance, etc.

Such templating software offers improved precision in measurements as it can measure fractions of millimeters and degrees, while traditional visual measurement, even in the best situation, can only get close to one millimeter.

Published studies have shown the following advantages for digital templating: It is more accurate than conventional method when done properly. It is quicker and more efficient than the conventional technique. It eliminates magnification error by accurately resealing the radiographic image. It permits better choice of prosthesis size and shape. It is cost-efficient by eliminating the need for printed radiographs and required labor and storage. It eliminates need for numerous copies of the acetate templates of the available implants or when a new prosthesis becomes available. By eliminating the need for acetate templates, manufacturers save the cost required for their production and distribution. The data is easily accessible and the templated image can be transferred electronically the operating rooms and be used during operation. Permanent electronic records can be generated and stored for further use. It is environmentally safe while acetate templates are dangerous for environment.

Introduction of digital templating software has allowed orthopedic surgeons to overcome shortfalls of conventional templating in a cost-effective way.

As mentioned above, many hospitals have converted to PACS for radiographic image acquisition and storage. For those that also have digital templating software, they save on the cost of printing films for pre-operative planning, and they do not have to spend precious economic resources on space and labor necessary to store and retrieve film.

Currently Available Options for Digital Templating

Currently available templating software can be categorized into three major groups.

1. Integrated Applications.

Templating software is integrated into the PACS as an option available for additional cost. This group requires additional interface application software to communicate with PACS via network to import the radiographic image for further evaluation and templating. This type of software is typically brand-specific and works only with same brand of PACS.

2. Non-PACS Applications

The templating software is independent from PACS but still requires additional interface application software and network connection with the PACS server to communicate and import images for templating purposes. Compatibility of this group with different PACS is always an issue and needs constant upgrading as new systems are developed and periodically introduced to market. This is a major contribution factor in their high maintenance cost, which is ultimately transferred to end users and payors.

3. Web-Based Applications

Web-based templating software, like the non-PACS group, is independent from PACS, but unlike the non-PACS group, it requires internet connection. The user has to connect to a web-based digital software provider's website via internet access and log in to a user account. The user then has to create anew case for each patient and upload the previously saved images to the website in order to use their templating software for pre-operative planning. In another embodiment, special PACS-specific software (for additional cost) is used to upload images directly from the PACS. The templated x-ray then has to be downloaded.

The conventional technique of pre-operative templating has become increasingly impractical with the implementation of digital image acquisition technology and digital image viewing. Notwithstanding the variety of available options and having PACS as then radiology system, many hospitals still have not taken advantage of digital templating, and it is not widely used. Up to now, major barriers to widespread use of digital templating software have been the high initial purchase cost as well as the need to maintain all available digital templating software products. The only currently available web-based option also requires costly subscription.

SUMMARY OF THE INVENTION

The invention provides hospitals and orthopedic surgeons significantly optimized digital templating tools for pre-operative planning. This includes increasing efficiency and reducing cost of the system. This invention facilitates effective pre-operative planning, an essential part of many orthopedic operations, using digital templating.

The invention provides a stand-alone system that is not a part of a PACS nor requires interface and connection to PACS or interact connection to a web-based digital templating provider's website. By capturing a radiographic image directly from the computer's screen while being viewed by a user, it provides an efficient, independent, and stand-alone system with no extra requirement. System software just needs to be installed on a computer that is to be used for reviewing radiographic x-rays. It also supports different image formats and opens previously saved radiographic images for templating.

It is not brand-specific, and it works over any image viewer software such as is currently used by the orthopedic surgeon.

The instant invention includes at least the following features:

1. Image Acquisition

Software of the invention employs digital image capturing technology and directly captures radiographic images from a computer's screen displaying the image. In addition, the software is designed to support different digital image formats and can be used to open saved images.

2. Templating Application

Software provides a tool for optimization of the magnification to match precisely patient radiographic image to template, also known as resealing, making different measurements and assessing alignment possible. The library of digital templates can include an unlimited number of templates of all different kinds of prosthesis from all of the manufacturers. The software is designed so that it can be updated by adding more templates at any time.

An aspect of the invention is a computer system (a medical device) useful for pre-operative templating for prosthetic arthroplasty. The system includes at least one processor; memory associated with the at least one processor, said memory storing data including (a) a radiographic image of a joint of a patient in need of replacement of said joint, wherein said image includes a standard scaling marker; and (b) at least one digital template of a prosthesis potentially suitable for use in replacement of said joint; an electronic visual display; and a digital templating program stored in the memory, the program having a plurality of instructions which, when executed by the at least one processor, cause the at least one processor to: (i) capture and import a selected portion of the radiographic image shown on said display, and (ii) scale the imported portion of the radiographic imago to match the scale of the at least one digital template.

In one embodiment, the digital templating program further comprises instructions which, when executed by the at least one processor, cause the at least one processor to superimpose (a) the scaled imported image of the joint and (b) the template of the prosthesis, to generate a templated image, enabling the user to assess suitability of an actual prosthesis corresponding to the template for use in replacement of the joint.

An aspect of the invention is a computer-implemented method of pre-operative templating for prosthetic arthroplasty. The computer-implemented method includes the steps of:

displaying on an electronic visual display connected to a computer, a radiographic image of a joint of a patient in need of replacement of said joint, wherein said image includes a standard scaling marker;

capturing and importing at least a portion of said radiographic image displayed on the electronic visual display, including the joint in need of replacement and the standard scaling marker, and storing the imported portion of the radiographic image in a first memory of the computer;

scaling the imported portion of the radiographic image to match the scale of a digital template of a prosthesis potentially suitable for use in replacement of said joints wherein said template is stored in a second memory of the computer, thereby generating a scaled imported image of the joint; and superimposing (a) the scaled imported image of the joint and (b) the template of the prosthesis, to generate a templated image, thereby enabling a user to assess suitability of an actual prosthesis corresponding to the template for use in replacement of the joint.

An aspect of the invention is a computer program product residing on a non-transitory computer readable medium having a plurality of instructions stored thereon which, when executed by a computer processor, cause that computer processor to:

(i) capture and import at least a portion of a radiographic image of a joint in need of replacement, wherein said radiographic image comprises a standard scaling marker and the image is displayed on an electronic visual display connected to a computer;

(ii) scale the imported portion of the radiographic image to match the scale of a digital template of a prosthesis potentially suitable for use in replacement of said joint, thereby to generate a scaled imported image of the joint; and (iii) superimpose (a) the scaled imported image of the joint and (b) the template of the prosthesis, to generate a templated image, thereby enabling a user to assess suitability of an actual prosthesis corresponding to the template for use in replacement of the joint.

In one embodiment, the computer program product is a stand-alone computer program product.

In one embodiment, the computer is a stand-alone computer.

BRIEF DESCRIPTION OF THE DRAWING

FIG. 1 depicts a representative template for a hip prosthesis.

DETAILED DESCRIPTION OF THE INVENTION

An aspect of the invention is a computer system (a medical device) useful for pre-operative templating for prosthetic arthroplasty. The system includes at least one processor; memory associated with the at least one processor, said memory storing data including (a) a radiographic image of a joint of a patient in need of replacement of said joint, wherein said image includes a standard sealing marker; and (b) at least one digital template of a prosthesis potentially suitable for use in replacement of said joint; an electronic visual display; and a digital templating program stored in the memory, the program having a plurality of instructions which, when executed by the at least one processor, cause the at least one processor to: (i) capture and import a selected portion of the radiographic image shown on said display; and (ii) scale the imported portion to radiographic image to match the scale of the at least one digital template.

The radiographic image is a digital radiographic image stored on computer-readable memory. Source data for the radiographic image can be stored on a date server or computer-readable memory separate from the system of the invention. Such source data can be in any suitable format, and, notably, the system is independent of any particular format by which such information is stored. For example, the system can work with source data stored using any PACS system, regardless of PACS supplier, provided the image can be displayed, with the use of an appropriate image viewer, on the electronic visual display of the system.

In order to display the radiographic image on the electronic visual display, in one embodiment the processor and memory of the system are connected to a PACS database. A user selects a desired image for display, and an appropriate image viewer displays the image on the electronic visual display.

In another embodiment, the processor and memory of the system access data corresponding to the radiographic image that has been saved to memory that can be removably connected to a computer comprising the processor and memory of the system. For example, and without limitation, the data can be stored on an optical disc (e.g., a DVD-R or DVD-RW), external hard drive, a memory card, or a flash drive. A user selects a desired image for display, and an appropriate image viewer displays the image on the electronic visual display.

An image viewer or image browser is a computer program that can display stored graphical image; it can usually handle various graphics file formats. Such software usually renders the image according to properties of the display such as color depth, display resolution, and color profile.

In one embodiment, the image viewer resides on the removable memory. In one embodiment, the image viewer resides on memory that is non-removably attached to the computer.

Importantly, the image that is captured, imported, and scaled by the system is the image, or a selected portion thereof, that is displayed on the electronic visual display, and not the source data from which such image is generated. In this way, the captured image may be analogized to a picture of a painting, whereby the system manipulates the picture (data derived from the displayed image), rather than the painting (PACS data underlying the image) itself.

The joint can be any joint of a mammal. In one embodiment, the joint is a hip. In one embodiment, the joint is a knee. In one embodiment, the mammal is a human. The invention expressly contemplates and embraces additional embodiments of joints and mammals.

A patient in need of replacement of a joint refers to any mammalian subject having a joint in need of repair or replacement. Such patients are well described in the medical and veterinary literature and will be readily recognized by persons skilled in the art. In one embodiment, the patient is a human.

The image includes an image of a standard scaling marker. As used herein, a standard scaling marker, also known as a standard scaling radiographic marker, is an object with known size placed next to a patient's body on the radiographic examination table at the time of taking the x-ray. It is typically made either as a 10-cm long stick containing a radio-opaque circle at either end, or as a 25-cm diameter radio-opaque sphere.

In one embodiment, the image of the joint and the standard scaling marker are captured and imported as a single object. In an alternative embodiment, the image of the joint and the standard scaling marker are captured and imported independently, i.e., as separate objects; in this latter embodiment, any scaling of the imported image of the joint is performed with reference to the independently imported image of the standard scaling object.

The computer memory also stores at least one digital template of a prosthesis potentially suitable for use in replacement of a joint. In one embodiment, the memory stores a library of such digital templates, for example, tens, hundreds, or more digital templates. The library can be modified to add and remove individual templates, or groups of templates, as desired. For example, a template or group of templates can be added to the memory when a new prosthesis or group of prostheses comes onto the market. Conversely, a template or group of template can be removed from the memory when a particular prosthesis or group of prostheses is removed from the market.

Digital templates typically are provided by various manufacturers of prostheses, in, for example and without limitation, dxf (Drawing Exchange Format), pdf (Portable Document Format), hp (Hewlett-Packard Distribution Binary File), and hpgl (Hewlett-Packard Graphics Language) file formals, which are common formats in graphic design and used for this kind of templates. They are then converted into scalable vector graphic (SVG) format which is smaller in size and less complex.

Each digital template has two components:
1. Outline shape of implant with clear background in 1:1 (one to one) scale with no magnification, identical in size to the actual implant.
2. Descriptive text displaying specifications of the template, such as template maker, model name, offset, and other information useful for the user. See, for example, FIG. 1.

These two components of each template may be stored in memory in such manner that they are separable, albeit linked in some fashion. Alternatively, these same features may be stored in memory as a single object, i.e., in such a manner that they are not separable.

The system includes an electronic visual display which connected to the computer. The electronic visual display is a visual display such as a liquid crystal display (LCD) or organic light-emitting diode display suitable for use with a computer. In one embodiment, the display an integral part of the computer, e.g., as for a laptop computer. In one embodiment, the display is a free-standing electronic device that capable of being connected to a computer. Electronic visual displays, and computers with built-in electronic visual displays, are well known in the art and are available from any number of commercial suppliers.

The digital templating program is machine-readable code capable of directing a computer processor to execute the steps of (i) capturing and importing a selected portion of the radiographic image shown on the display; and (ii) scaling the imported portion of the radiographic image to match the scale of the at least one digital template, thereby generating a scaled imported image of the joint.

The scaled image of the joint and the template are generally scaled to match one another. In one embodiment, the scaled image of the joint and the template are each 100 percent of the actual size of the physical objects they represent. In this embodiment they match not only each other but also the patient in actual size.

In another embodiment, the scaled image of the joint and the template match each other but are each less than 100 percent of the actual size of the physical objects they represent. For example, in various embodiments the scaled image of the joint and the template match each other but are each 10 percent, 20 percent, 30 percent, 40 percent, 50 percent, 60 percent, 70 percent, 80 percent, 90 percent, 95 percent, and 99 percent of life-size, as well as every value therebetween.

In yet another embodiment, the scaled image of the joint and the template match each other but are each greater than 100 percent of the actual size of the physical objects they represent. For example, in various embodiments the scaled image of the joint and the template match each other but are each 101 percent, 110 percent, 120 percent, 130 percent, 140 percent, 150 percent, 160 percent, 170 percent, 180 percent, 190 percent, 200 percent, 300 percent, 400 percent, and 500 percent of life-size, as well as every value therebetween.

In one embodiment, the digital templating program of the invention separates the shape and text portions of a given template, one from another, so they are related but not as one object. The user can move the text of the template independently from the shape of the template, while keeping their information linked, and superimpose or overlay these portions on different areas of the image of the joint. This feature is useful in eliminating overcrowding and organizing important information and making it easier to find. In contrast, in all existing templating software, text and shape are treated as one object.

In one embodiment, the system further includes a user input device for enabling a user to select at least a portion of said radiographic image. In one embodiment, the selected portion of the radiographic image includes both the joint in need of replacement and the standard scaling marker, for capture and importation by the digital templating software. In an alternative embodiment, the user input device for enabling a user to select at least a portion of said radiographic image permits the use to capture and import, independently of one another, the image of the joint in need of replacement and the image of the standard scaling marker.

Any suitable computer pointing device can be used. For example, the computer pointing device can be a computer mouse, a joystick, a touchpad, a touch screen, or a stylus. In one embodiment, the computer pointing device is a computer mouse. Computer pointing devices are well known in the art and are available from any number of commercial suppliers.

In one embodiment, the digital templating further comprises instructions which, when executed by the at least one processor, cause the at least one processor to superimpose (a) the scaled imported image of the Joint and (b) the template of the prosthesis, to generate a templated image, enabling the user to assess suitability of an actual prosthesis corresponding to the template for use in replacement of the joint. The templated image can be used, for example, intra-operatively by the surgeon, to confirm the selection of the actual prosthesis and/or aspects relating to its implantation.

In one embodiment, the computer system includes a stand-alone computer. A stand-alone computer refers to a computer that is operated, or is capable of being operated, without connection to a network or the internet. Stand-alone computers are well known in the art and are available from any number of commercial suppliers.

In one embodiment, the stand-alone computer is a computer that is operated without connection to a network or the internet. In one embodiment, the stand-alone computer is a computer that is effectively operated without connection to a network or the internet, i.e., even if physically or wirelessly connected to a network or the internet, the computer is operated without reliance on such connection.

For example, in one embodiment the computer may access a radiographic image from a PACS through a network connection, and then such network connection optionally can be closed. The stand-alone computer then performs all the steps of capturing, importing, scaling, and, optionally, superimposing, irrespective of the status of such network connection.

In one embodiment, the computer system includes a computer pad or telecommunication-integrated telephone/pad. For example, the computer system may include a so-called pad computer or tablet computer such as is available from a number of commercial suppliers (e.g., Apple, Dell, Hewlett-Packard, Asus). As another example, the computer system may include a so-called smartphone such as is available from a number of commercial suppliers (e.g., Apple, Blackberry, Palm).

An aspect of the invention is a computer-implemented method of pre-operative templating for prosthetic arthroplasty. The computer-implemented method includes the steps of:

displaying on an electronic visual display connected to a computer, a radiographic image of a joint of a patient in need of replacement of said joint, wherein said image includes a standard sealing marker;

capturing and importing at least a portion of said radiographic image displayed on the electronic visual display, including the joint in need of replacement and the standard scaling marker, and storing the imported portion of the radiographic image in a first memory of the computer;

scaling the imported portion of the radiographic image to match the scale of a digital template of a prosthesis potentially suitable for use in replacement of said joint wherein said template is stored in a second memory of the computer, thereby generating a sealed imported image of the joint; and superimposing (a) the scaled imported image of the joint and (b) the template of the prosthesis, to generate a unlimited image, thereby enabling a user to assess suitability of an actual prosthesis corresponding to the template for use in replacement of the joint.

In one embodiment, the computer-implemented method is performed using a computer system of the invention.

In one embodiment, the method further includes saving the templated image to a third memory of the computer. The saved templated image can be used, for example, intra-operatively by the surgeon, to confirm the selection of the actual prosthesis and/or aspects relating to its implantation. Of course, the second memory and the first memory can reside at different addresses within a single memory device or carrier.

In one embodiment, at least the third memory is removably connected to the computer. For example, and without limitation, the third memory can be an optical disc (e.g., a DVD-R or DVD-RW), external hard drive, a memory card, or a flash drive.

In one embodiment, the scaled imported image of the joint and the digital template are both 100 percent of their respective actual sizes. That is, both the image of the joint and the template are scaled to match, not only each other, but also exactly the actual physical structures they represent. For example, a digital template is usually provided scaled 1:1 to the actual size of the prosthesis it represents. The image of the joint is then scaled to the actual size of the joint in the patient. When the identically scaled, representations are superimposed, the resulting image is life-size and provides the user with valuable information as to the suitability of the actual prosthesis for its intended use in the patient.

In another embodiment, the scaled imported image of the joint and the template match each other but are each less than 100 percent of the actual size of the physical objects they represent. For example, in various embodiments the scaled imported image of the joint and the template match each other but are each 10 percent, 20 percent, 30 percent, 40 percent, 50 percent, 60 percent, 70 percent, 80 percent, 90 percent, 95 percent, and 99 percent of life-size, as well as every value therebetween.

In yet another embodiment, the scaled imported image of the joint and the template match each other but are each greater than 100 percent of the actual size of the physical objects they represent. For example, in various embodiments the sealed image of the joint and the template match each other but are each 101 percent, 110 percent, 120 percent, 130 percent, 140 percent, 150 percent, 160 percent, 170 percent, 180 percent, 190 percent, 200 percent, 300 percent, 400 percent, and 500 percent of life-size, as well as every value therebetween.

Similarly, a saved templated image can be made such that the scaled imported image of the joint and the digital template are both 100 percent of their respective actual sizes. That is, both the image of the joint and the template are scaled to match, not only each other, but also exactly the actual physical structures they represent. For example, a digital template is usually provided sealed 1:1 to the actual size of the prosthesis it represents. The image of the joint is then scaled to the actual size of the joint in the patient. When the identically scaled, life-size representations are superimposed and then saved as a templated image, the resulting templated image is life-size and provides the user with valuable information as to the suitability of the actual prosthesis for its intended use in the patient.

In another embodiment, the saved templated image is less than 100 percent of the actual size of the physical objects it represents. For example, in various embodiments the saved templated image is 10 percent, 20 percent, 30 percent, 40 percent, 50 percent, 60 percent, 70 percent, 80 percent, 90 percent, 95 percent, and 99 percent of life-size, as well as every value therebetween.

In yet another embodiment, the saved templated image is greater then 100 percent of the actual size of the physical objects it represents. For example, in various embodiments the saved templated image is 101 percent, 110 percent, 120 percent, 130 percent, 140 percent, 150 percent, 160 percent, 170 percent, 180 percent, 190 percent, 200 percent, 300 percent, 400 percent, and 500 percent of life-size, as well as every value therebetween.

The digital templating processes described above may be implemented in software, hardware, firmware, or any combination thereof. The processes are preferably implemented in one or more computer programs executing on a programmable computer including at least one processor, a storage medium readable by the processor (including, e.g., volatile and non-volatile memory and/or storage elements user input devices (e.g., a keyboard, a computer mouse, a joystick, a touchpad, a touchscreen, or a stylus), and one or more output devices (e.g., a computer display). Each computer program can be a set of instructions (program code) in a code module resident in the random access memory of the computer. Until required by the computer, the set of instructions may be stored in another computer memory (e.g., in a hard disk drive, or in a removable memory such as an optical disk, external hard drive, memory card, or flash drive) or stored on another computer system and downloaded via the Internet or other network.

An aspect of the invention is a computer program product residing on a non-transitory computer readable medium having a plurality of instructions stored thereon which, when executed by a computer processor, cause that computer processor to;

(i) capture and import at least a portion of a radiographic image of a joint in need of replacement, wherein said radiographic image comprises a standard sealing marker and the image is displayed on an electronic visual display connected to a computer;

(ii) scale the imported portion of the radiographic image to match the scale of a digital template of a prosthesis potentially suitable for use in replacement of said joint, thereby to generate a sealed imported image of the joint and (iii) superimpose (a) the scaled imported image of the joint and (b) the template of the prosthesis, to generate a templated image, thereby enabling a user to assess suitability of an actual prosthesis corresponding to the template for use in replacement of the joint.

Importantly, in one embodiment the computer program product of the invention is a stand-alone computer program product. That is, the computer program product can be used independently of any software interface, including software accessed through connection to a network or the internet, in order to cause the computer processor to perform the operations noted above. In this context, it is to be understood that any appropriate image viewer application is not considered to be interface software.

In one embodiment, the computer program product is provided as an application that can be remotely downloaded onto a computer, computer pad, or so-called smartphone. Once downloaded to such device, the computer program product can be used independently of any software interface, including software accessed through connection to a network or the internet, in order to cause the computer processor to perform the operations noted above.

In one embodiment, the computer is a stand-alone computer, such as is described above.

In one embodiment, the computer is a pad computer or tablet computer, as described above.

In one embodiment, software of the invention is designed to start automatically when the computer is turned on and the operating system is loaded. No additional step needs to be performed by user to initiate the software in accordance with this embodiment. In an alternative embodiment, user starts the software manually by clicking on an icon associated with the software. The software can stay in background in standby mode, ready to use, without utilizing any capacity of the computer.

In one embodiment, the computer program product provides a library of digital templates for any number of different prostheses, e.g., from various manufacturers and in different sizes and shapes. All the user needs to do is to point at, or click on, the desired prosthesis on a menu of prostheses (digital templates). Software superimposes the selected template and imported scaled radiographic image (i.e., effectively overlays the template on the x-ray). Using the computer mouse (for example), use then positions the template on the part of the bony structure that is going to be replaced and adjusts the size and alignment proper to the patient's anatomy and considering any required corrections. User can easily switch between sizes and shapes of a particular implant, orientation of the components, and even between different kinds of prosthesis with a few clicks or keystrokes.

User can position the scaled imported radiographic image and the template relative to one another in the same plane. In one embodiment, this entails moving the template relative to the scaled imported radiographic image, for example, effectively sliding the template into position over the scaled imported radiographic image of the joint of interest. In one embodiment, this entails moving the scaled imported radiographic image relative to the template.

User can rotate the scaled imported radiographic image and the template, relative to one another in the same plane. In one embodiment, this entails rotating the template either clock-wise or counter-clockwise. In one embodiment, this entails rotating the scaled imported radiographic image either clock-wise or counter-clockwise.

The positioning and rotating can be performed iteratively to achieve a desired outcome, e.g., a best possible match between template and joint.

In one embodiment, such positioning and/or rotating cart be performed automatically by the computer program. For example, the program can position the scaled imported radiographic image and the template relative to one another in the same plane. In one embodiment, this entails moving the template relative to the scaled imported radiographic image, for example, effectively sliding the template into position over the scaled imported radiographic image of the joint of interest. In one embodiment, this entails moving the scaled imported radiographic image relative to the template. Alternatively or in addition, program can rotate the scaled imported radiographic image and the template relative to one another in the same plane. In one embodiment, this entails rotating the template either clock-wise or counter-clockwise. In one embodiment, this entails rotating the scaled imported radiographic image either clock-wise or counter-clockwise.

In one embodiment, the computer program product permits a user to select a different color for each template based on darkness of the color of the area behind the template. A darker color is more visible over a light background, such as bony tissue. A lighter color can be seen more readily over a dark background, such as soft tissue.

In one embodiment, the computer program product includes a built-in tool that is a leg length difference measurement tool. To use this tool, user clicks on as few as four predetermined landmarks (two pairs of landmarks) on the x-ray, and then software calculates the difference in lengths defined by each of the two pairs of landmarks. Alternatively, software simply determines the lengths defined by each of the two pairs of landmarks. This calculation is very important and is considered in practically every hip arthroplasty.

In one embodiment, the computer program product also provides additional tools for different measurements, not limited to length, distance and angles.

The present invention has at least the following advantages over currently available templating software:

It does not require interact connection with provider's website to be able to upload images and template. It can be installed and can work on a stand-alone computer with no additional requirement. It can be used, for example, anywhere and under any condition where Internet connection is not available.

Being installed and running on a computer requiring no additional connection, it functions much faster than any currently available templating software. A user can template an image in a very short period of time.

Installation and use on a computer requiring no additional connection with any external network or website eliminates any PHI (Protected Health Information) security issue that has been a common problem.

A feature of this software is that importing an image in accordance with the invention lowers its cost compared to all other kinds of digital templating software. It can be offered affordably for any size of organization and practice. As mentioned earlier, all currently available forms of templating software are very expensive to purchase.

It is has minimal to no cost for maintenance. In contrast, currently available forms of templating software are very expensive to maintain and upgrade.

Having been designed by an end-user, this software is very user-friendly with tools and options that are very easy to use. A new user will need minimal to no training at all for using this software.

This independent and easy-to-use software overcomes the primary barriers to widespread use of digital templating, increases quality of orthopedic operations, saves the cost of inventory, and eliminates the need for acetate templates and corresponding costs for their production, distribution, and storage.

The invention now being generally described, it will be more readily understood by reference to the following Example, which is included merely for purposes of illustration of certain aspects and embodiments of the present invention, and is not intended to limit the invention.

Example

A user views the radiographic images consistent with current standard practice, and chooses at least one appropriate existing image for pre-operative planning. For example, for a total hip arthroplasty, usually an anteroposterior (AP) view of the pelvis is selected, Step I: Importing the Image When ready for templating:

1) User presses a programmed function key (e.g., the default key can be F11) to activate the software and bring it to capture mode from standby mode.

2) By pressing the function key, the mouse cursor changes from the typical arrow shape to a plus sign (+), showing it is ready to capture and import at least a selected portion of the image displayed on the computer screen. User moves the computer mouse and places the cursor over one corner of or one location in, a x-ray image and then presses and holds the left click button of the mouse (or the corresponding key on the keyboard).

3) User moves the cursor diagonally to the opposite corner while holding the left click button on computer's mouse. This action highlights the area of the radiographic image that is going to be used in templating.

4) When the cursor reaches the opposite corner, user releases the left click button of the mouse. At this point the importing part of the process ends. The software automatically imports the highlighted area for templating, which is performed in Step II (below).

Step II: Pre-Operative Planning

At the end of Step I, the software automatically opens the digital templating window. User does not have to do anything for this step. When the software opens:

1) It displays a warning message reminding the user that the image may not be scaled and giving option to rescale it, for example to 100% with no magnification.

2) By clicking on "Yes" button and choosing this important option, the mouse cursor again changes to a plus sign (+) and user highlights the standard marker included in the image. This function is performed the same way as in Step I by pressing the left click button of the mouse on one side or end of the marker, moving the mouse cursor toward the opposite side or end of the marker while holding down the left click button, and releasing the left click button when the cursor reaches the opposite side of the marker.

3) Next, a window opens and user enters the known length or diameter of the standard marker. By clicking on "Apply" button, software automatically rescales the image to 100%.

4) From this point any measurement made on the resealed x-ray image will be identical to the same measurement as if made directly on the patient's body, allowing the user to accurately measure important bony structures that are critical in operation.

5) Software provides a library of digital templates for any number of different to prostheses, e.g., from various manufacturers and in different sizes and shapes. All the user needs to do is to point at, or click on, the desired prosthesis on a menu of prostheses (digital templates). Software adds the selected template to (i.e., effectively overlays it on) the x-ray. Using the computer mouse (for example), user then positions the template on the part of the bony structure that is going to be replaced and adjusts the size and alignment proper to the patient's anatomy and considering any required corrections. User can easily switch between sizes and shapes of a particular implant, orientation of the components, and even between different kinds of prosthesis with a few clicks or keystrokes. User can rotate the scaled radiographic image and the template relative to one another in the same plane. In one embodiment, this entails rotating the scaled radiographic image either clock-wise or counter-clockwise. In one embodiment, this entails rotating the template either clockwise or counter-clockwise.

6) User can select a different color for each template based on darkness of the color of the area behind the template. A darker color is more visible over a light background, such as bony tissue. A lighter color can be seen more readily over a dark background, such as soft tissue.

7) Optionally, user clicks on as few as four predetermined landmarks (two pairs of landmarks) on the x-ray, and then software calculates the difference in lengths defined by each of the two pairs or landmarks. Alternatively, software simply determines the lengths defined by each of the two pairs of landmarks. This calculation is very important and is considered in practically every hip arthroplasty.

8) After templating the x-ray and making the desired measurements, the templated image is saved and can be used during operation as guidance for selecting an appropriately sized and shaped prosthesis.

Equivalents

The invention has been described broadly and generically herein. Those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described heroin are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention. Further, each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

I claim:

1. A computer-implemented method of pre-operative templating for implantation of a prosthesis, comprising:
   displaying in a first window on an electronic visual display a radiographic image of a patient;
   capturing at least a portion of the radiographic image displayed in the first window on the electronic visual display without accessing source data of the radiographic image;
   scaling the captured at least portion of the radiographic image to match a scale of a digital template of a prosthesis potentially suitable for use in the patient; and
   superimposing in a second window on the electronic visual display (a) the scaled at least portion of the radiographic image and (b) the template of the prosthesis, thereby enabling a user to assess suitability of an actual prosthesis corresponding to the template for use in the patient.

2. The method of claim 1, further comprising receiving from a user a selection of the at least portion of the radiographic image displayed in the first window for capturing, wherein the selection is drawn over the first window by the user using a computer pointing device.

3. The method of claim 2, wherein the user draws the selection by placing a cursor in a first location representing a first corner of the selection, pressing and holding a button, moving the cursor to a second location representing a diagonally opposite corner of the selection, and releasing the button.

4. The method of claim 2, wherein the selection includes an object of known size shown in the radiographic image.

5. The method of claim 4, further comprising:
   receiving from the user a second selection of a portion of the selection, said second selection being drawn by the user using the computer pointing device and including the object of known size.

6. The method of claim 5, further comprising:
   receiving from the user a length or diameter of the object of known size identified by the second selection.

7. The method of claim 1, further comprising:
   receiving from a user a designation of at least two pairs of landmarks within the second window;
   calculating first and second lengths defined by each of the at least two pairs of landmarks.

8. The method of claim 1, further comprising:
   saving the superimposed contents of the second window to a memory as a templated image.

* * * * *